2,958,258
Patented Nov. 1, 1960

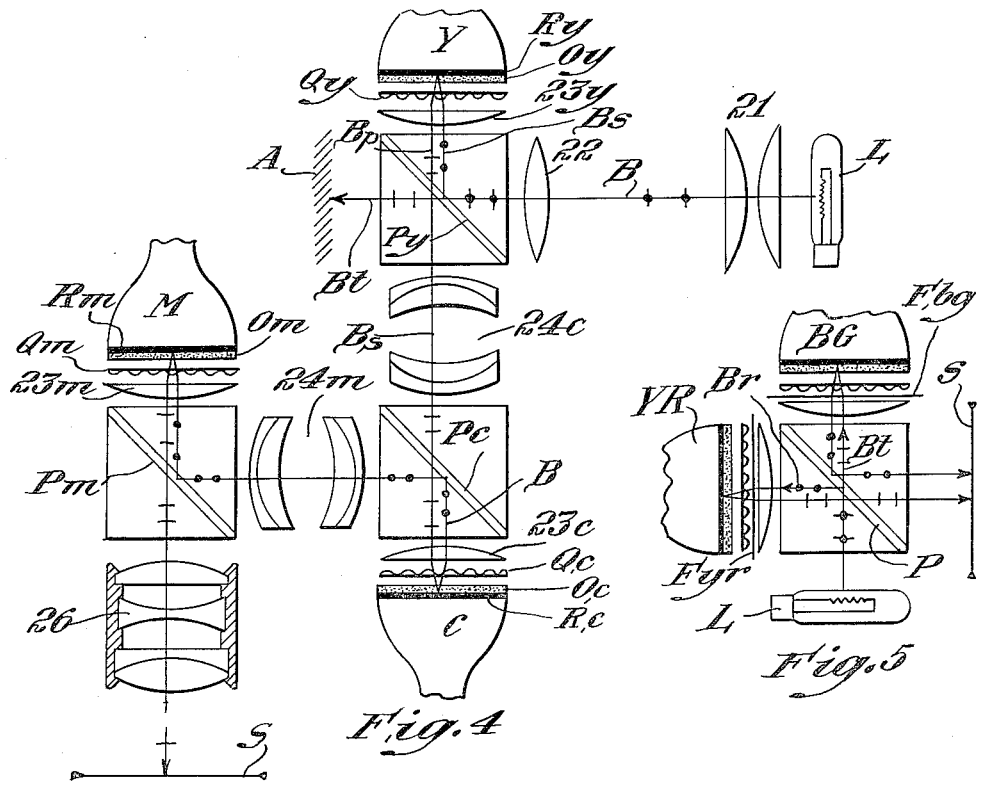
Fig. 4
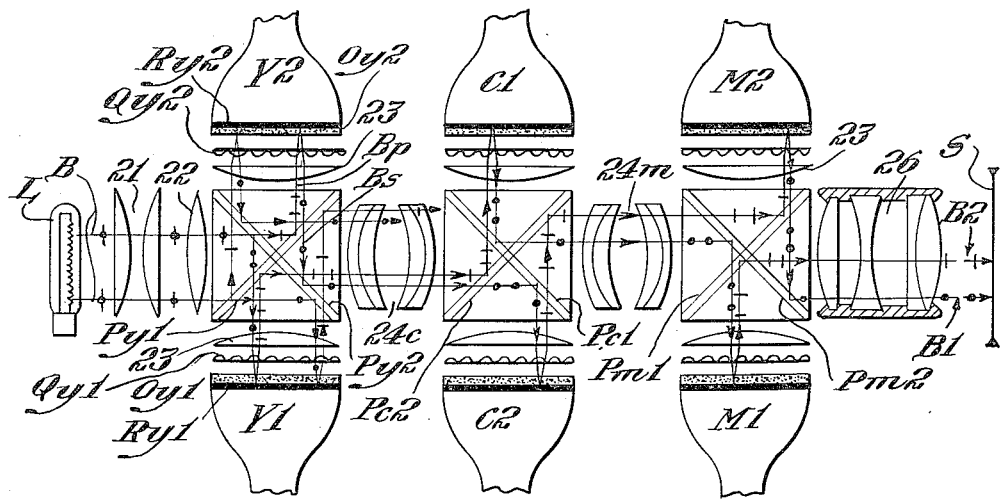
Fig. 5
Fig. 6

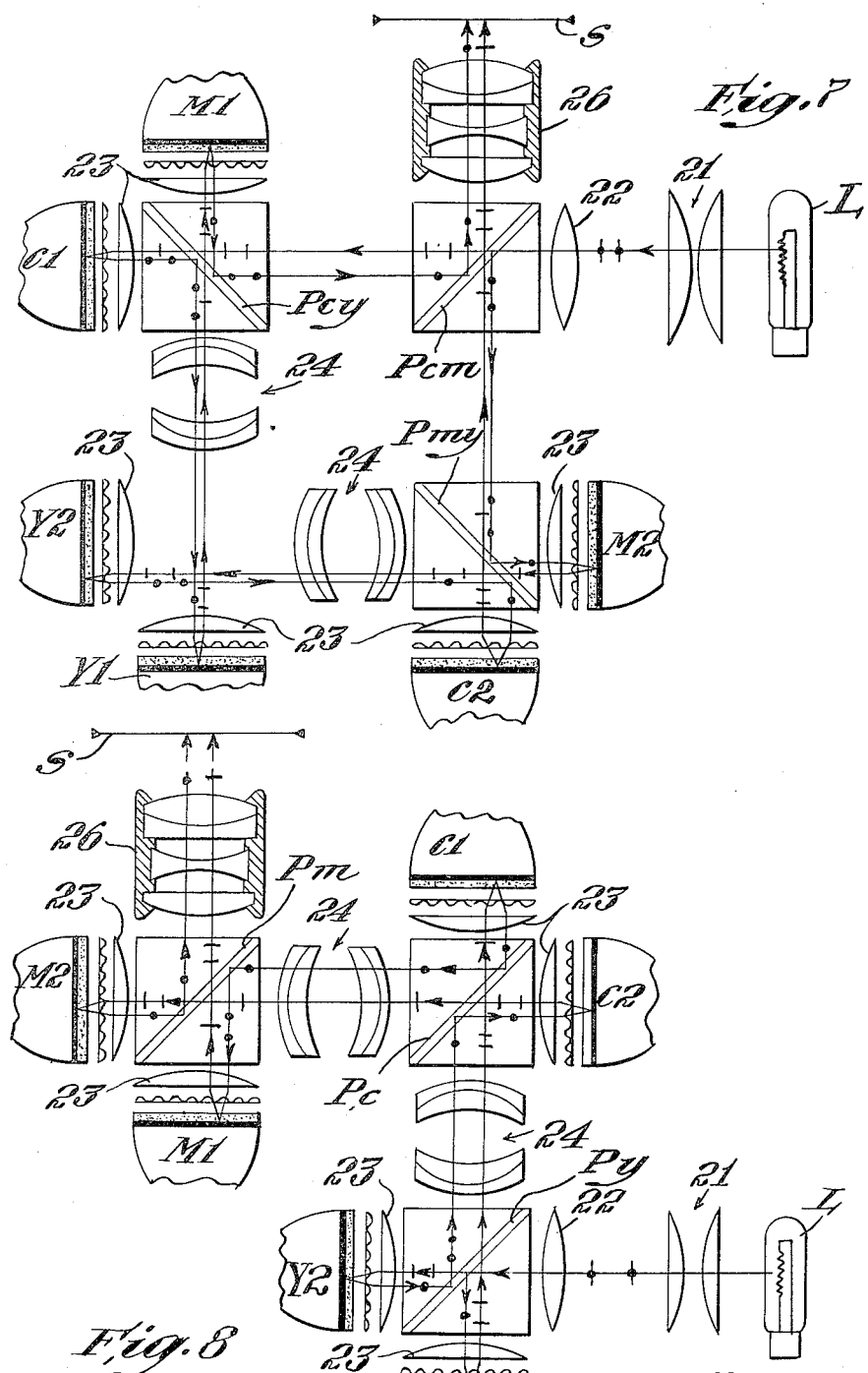

2,958,258

OPTICAL PROJECTION OF BEAM CONTROLLED OBJECT FIELDS

Donald H. Kelly, Los Angeles, Calif., assignor to Technicolor Corporation, Hollywood, Calif., a corporation of Maine Filed Sept. 21, 1953, Ser. No. 381,342

16 Claims. (Cl. 88—24)

The present invention relates to a system for projecting light through an image-controlled modulating surface.

The projection of electronically controlled image defining transparencies, such as the scotophor or mechanical obstructor type screens of cathode ray tubes, presents the problem of mechanical interference of the electron beam and light beam paths. In order to avoid such interference, the optical and electron paths must be on different, intersecting or skewed axes, which requires correction of at least one of the beams relative to the final image plane.

If the electron gun is placed off axis, costly and complicated circuits are necessary for correcting focus, deflecting, linearity, and spot intensity and size. On the other hand, if the optical system is off axis, then the electron image must be predistorted by other, similarly costly and complex correction circuits in order to obtain a rectilinear image at the projection screen.

It has been proposed, in order to avoid off-axis beams, to use a scotophor tube with an aluminum backing and an envelope of conventional shape aligned with a Schmidt projector and with a source of illumination which is effective through the unused space in the center of the spherical mirror. While this use of an aluminum backing on the scotophor screen avoids the off-axis skewing problem because both the electron gun and the lightsource can be placed on axis, such systems have all the disadvantages of Schmidt optics, such as a short throw due to the wide angle characteristic of such optics and the costliness of mirrors and corrector plates giving adequate definition. Such systems present additional difficulties if used for the projection of colored pictures.

Apart from these problems, the television projection system of optimum usefulness would be one in which only optical systems similar to present-day film projectors are used. In such systems, an external light source of unlimited brightness provides a beam which passes symmetrically through a light modulating object field, imaging it on a projection screen. The theater television systems commercially available at the present time use instead more or less conventional cathode ray tubes which act as both light source and optical modulator and are imaged on the screen by a Schmidt reflector. Systems of this type have the disadvantages of limiting the screen brightness to a level which is considerably below normal motion picture screen brightness, and in addition the above-mentioned shortcomings of wide angle reflective optics.

It is one of the principal objects of the present invention to provide a system of the above type wherein an independent light source can be arranged removed from the axis of a modulating object and wherein the light from this source can be conducted into and out of a transparent modulator, one side of which is inaccessible, as in the instance of a light modulating transparent surface which is in turn modulated by an electron beam.

Further objects are to provide systems of this type which permit a considerable improvement of the contrast characteristics of the projected image, which increase the light intensity of the projection system as a whole by way of using several sources of light energy, which are particularly suitable for purposes of color televisions, which are highly efficient with regard to utilization of the light energy available, and which use only refractive optical elements and are therefore less expensive and more easily maintained in good operating condition as compared to reflective systems or to specially designed refractive systems.

According to the invention, optical projection apparatus comprises in combination means for projecting a beam of light; means such as a beam modulated screen for optically modulating the light beam, the axes of the light projecting means and of the light modulating means being placed at an angle to each other; polarization selective means for reflecting a component beam of light which is polarized in one orientation and for transmitting a component beam of light which is polarized in the complementary orientation, with the polarization selective means being placed in the projected light beam to direct at least one of the component beams towards the modulating means; mirror means arranged behind the modulating means for reflecting the light of the component beam which is directed toward the mirror means, after originally impinging on this modulating means, back through the modulating means; and optical retardation means in front of the modulating means for rotating the plane of polarization of the originally impinging component beam into the complementary orientation, upon passing the retardation means a second time; whereby the now doubly modulated component beam is reflected in its own path toward the polarization selective means which directs it towards the screen means.

In one embodiment, the modulating, mirror and retardation means are placed in the reflected component beam which, upon reflection from the mirror means, is transmitted by the polarization selective means towards the screen means. In another embodiment, the modulating, mirror and retardation means are placed in the transmitted component beam which, upon reflection from the mirror means, is reflected by the polarization selective means towards the screen means.

In an important embodiment, the optically modulating means is the electron beam modulated image screen of a cathode ray tube of the scotophor or dark trace type, the reflecting means is a metallic deposit on this image screen, and the retardation means is a quarter wave plate oriented with its axis at 45° to the polarization plane of the component beam passing therethrough.

These and other objects and aspects of the invention will appear, in addition to those contained in the above summary indicating its nature and substance including some of its objects, from the herein presented outline of its principles, its mode of operation, and its practical possibilities together with a description of several typical embodiments illustrating its novel characteristics. These refer to drawings in which Figs. 1 and 2 are diagrams illustrating the principle of the invention, with the reflected and transmitted beams, respectively, being modulated;

Fig. 4 is a diagram illustrating a color modulated system with separate optics for each beam modulated screen;

Fig. 5 is a diagram of an additively modulated system constructed according to the invention;

Fig. 6 is a diagram illustrating a color television system of optimum efficiency employing crossed polarization selective coatings; and Figs. 7 and 8 are diagrams illustrating color television systems which utilize all available light similar to the system according to Fig. 6, but with simple polarization selective coatings.

Figure 1:
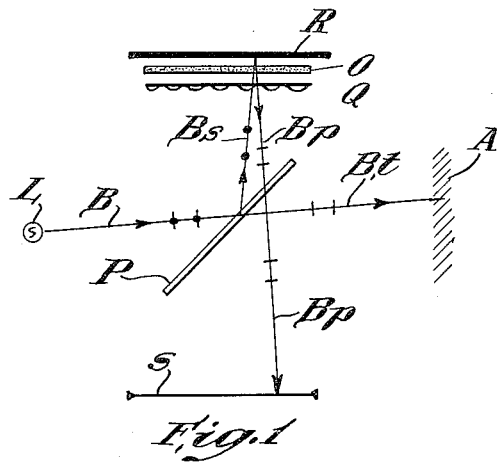

The principle of the invention will first be explained with reference to Figs. 1 and 2. In these figures, L is a conventional light source such as an incandescent lamp with appropriate beam forming means, and S is a conventional projection screen. An image pattern defining surface structure such as a transparency constituting the optically modulating object is indicated at O. This structure which impresses a pattern on a beam of light by selective transmission, thus optically modulating it imagewise can be a transparency such as a scotophor screen of the type described in Patents Nos. 2,481,621 and 2,481,622 to Rosenthal, or of the "Eidophor" type described in the Journal of the Society of Motion Picture and Television Engineers, of April, 1950, or a screen of the mechanical obstructor type described in Patent No. 2,128,631 to Eaton, or indeed any light modulating transparency whose pattern is controlled by a modulating electron beam or other beam of analogous effect, it being impossible for both modulating and modulated beams to be situated on a single axis without mutual interference. A mirror R is placed behind the transparency O, and an optical retardation means, such as a quarter wave plate Q, is placed in front of O.

P is a polarization selective, light dividing interference coating of the type described in U.S. Patents Nos. 2,403,731, to MacNeille, and 2,449,287 to Flood. The reflecting-transmitting structures of such devices are non-metallic and absorb practically no light. They are polarization selective in that they split an incident, unpolarized light beam into component beams polarized at right angles to each other, or selectively deflect or transmit incident polarized light. The polarization at complementary orientations will herein be referred to as "vertical" for a plane perpendicular to the plane of the paper and indicated by dots, and as "horizontal" for a plane parallel to the paper plane and indicated by dashes. In systems of the type herein mainly dealt with, these coatings are usually confined within prisms, either cubes or other shapes, but it is understood that the supporting structure is not essential with regard to the present invention. It is further understood that instead of a polarizing system P, a conventional transparent reflector in the form of a metallic coating could be used. However, reflectors of this type yield only 25% of the available light and can not yield more for the reason that they also divide the return beam, such as $Bp$ in Fig. 1 or $Bs$ in Fig. 2, so that the actual efficiency of such a system is considerably lower than that to be expected due to absorption at the metallic reflector. The use according to the present invention of polarizing dividers increases the theoretical efficiency of a single modulator-transparency system to 50%, and this can be increased, according to the invention, to a theoretical efficiency of 100% with the use of only a single light source. Other otherwise unattainable advantages will appear below.

Referring particularly to Fig. 1 the vertically polarized component beam $Bs$ is reflected toward the sandwich QOR, whereas the horizontally polarized component $Bt$ passes through P towards A where it can be absorbed, or further utilized in the manner to be described hereinbelow. The vertically polarized reflected beam $Bs$ first passes through the quarter wave plate Q which is cut and arranged with its crystal axis at 45° to the plane of polarization, and it is there converted to circularly polarized light in which condition it traverses the object O. It is then reflected at R, directed as $Bp$ towards the object O, and again passes this transparency and the quarter wave plate Q. Upon passing a second time through the quarter wave plate Q, the circularly polarized light is converted into horizontally plane polarized light, that is, light at an orientation complementary to that of $Bs$, in which condition $Bp$ it is now completely transmitted towards screen S, by the beam splitter P which formerly reflected it. The reflector R can be the aluminum backing, and the object O the conventional scotophor layer of a subtractively modulating cathode ray controlled screen, contained in a conventional cathode ray tube of any suitable or convenient shape.

Figure 2:
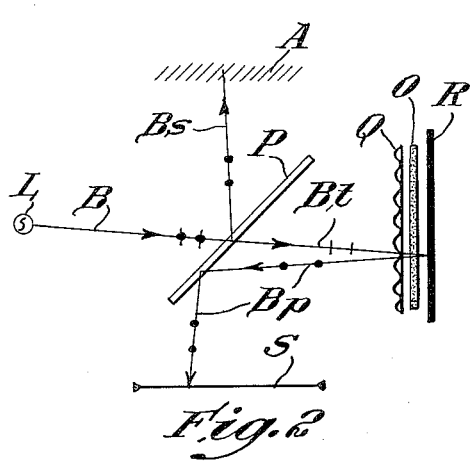

Fig. 2 is quite similar to Fig. 1 with the difference that the direct beam $Bt$ is transmitted towards the sandwich QOR, and the beam $Bp$, reflected at R, is again reflected at P towards the projection screen S. The lettering of Fig. 2 is similar to that of Fig. 1 and obviates any further detailed description of Fig. 2. The arrangements according to Figs. 1 and 2 form the basic units of all systems to be described hereinbelow.

The intensity of $Bp$ is theoretically 50% of the original intensity of beam B, less the modulation received at the object O and less the incidental losses which, however, are fairly low in a system of this type. Thus, systems according to Figs. 1 and 2 are twice as efficient as systems utilizing a metallic beam splitting reflector instead of the polarizing beam splitter P. Other advantages of polarizing the projection beam will be apparent hereinbelow.

By employing initially polarized light, multiply subtractive modulation can be accomplished with a single selective polarizer. Such embodiments are illustrated by an example according to Fig. 3.

Figure 3:
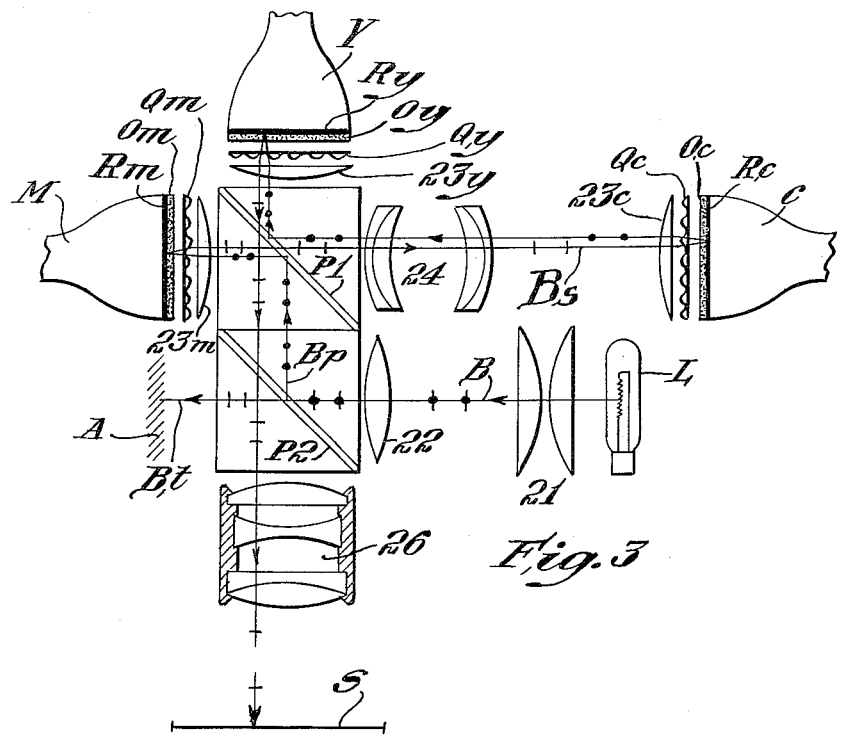
Fig. 3 is a diagram, illustrating subtractive modulation by a plurality of modulated screens.

In Fig. 3, L is again a light source, a projection lamp with condenser being schematically indicated. Y, M and C are three cathode ray tubes each with a scotophor layer, which layers are indicated at Oy, Om and Oc, respectively. The above described backing mirrors of these subtractive modulators are indicated at Ry, Rm, and Rc. These can consist of thin aluminum deposits applied to the inside of the modulator layers or of any appropriate structure. Qy, Qm and Qc are three quarter wave plates, corresponding to elements Q of Figs. 1 and 2. Two cube prisms with polarizing light splitters P1 and P2 are arranged face to face, as indicated at Fig. 3, such that light received at P1 is reflected and transmitted towards P2 and vice versa. Conventional copy lens systems 22, 23y, 23m, 23c and 24 are provided for imaging the face of each tube upon the next, and a projection lens system 26 images the final picture on screen S. The projecting beam B is modulated in series by the three scotophor surfaces Oy, Om, and Oc which represent the blue, green and red color aspects, respectively, and absorb the blue, green and red spectral ranges. The principal selective polarizer P1 is used subtractively to relate the three scotophor tubes Y, M and C, each of which reflects, at Ry, Rm, Rc, respectively, all colors when unmodulated but absorbs approximately one third of the visual spectrum wherever struck by the electron beam. The layer Oy of tube Y absorbs the blue light, the layer Om of M absorbs the green light, and the layer Oc of C absorbs the red light. The three tubes need to be registered only with respect to the cube containing the polarizer P1, the additional cube with polarizing divider P2 being used to introduce the light into the system with a 50% loss.

The light beam $Bp$ passes through each of the tubes in succession, whereas beam $Bt$ is lost at A. The unit magnification copy lenses which are required in the embodiments described below, to image the face of each tube upon the next, are replaced in the arrangement according to Fig. 3 by the single lens 24 which does this for all three tubes. It will be noted that the lens system 24 images the face of tube M upon that of tube C and also images, in the other direction, the face of tube C on that of tube Y. The simple field lenses 23y, 23m and 23c in front of each tube face have the purpose of collecting the light from the preceding condenser or copy lens and to concentrate it on the following copy lens or objective lens. Since these field lenses are not used to form an image on the screen, their quality is not critical; they could be eliminated by making the mirrors R, behind O, slightly concave. However, it is preferred to use field lenses in order to avoid scotophor screen curvatures opposite to the normal convex curvature of cathode ray tube face plates.

Having in mind the above description of the operation of Figs. 1 and 2, it will now be evident that the white light beam B coming from lamp L is at P2 separated into component beams, $Bp$ and $Bt$. $Bt$ is lost and the vertically polarized beam $Bp$ is reflected towards P1 where it is again reflected, through $Qm$ and $Om$, towards $Rm$, now being circularly polarized. At $Rm$ it is reflected back through $Om$ and $Qm$. Due to the rotating effect of $Qm$, the beam $Bs$ emerges horizontally polarized from $Qm$ and is therefore transmitted by P1. It is now partly color modulated, a spectral range in the green having been subtracted at $Om$ with increase of contrast. $Bs$ is further modulated in similar manner by $Oc$ where the red range is subtracted and at $Rc$ it is reflected towards P1, now being again vertically polarized. Due to this polarization it is reflected towards tube Y by P1. It is finally modulated at Y by subtracting the blue light and emerges horizontally polarized from $Qy$. Being thus polarized, it is transmitted by polarizers P1 and P2 and projected by 26 towards screen S where it images a picture in full color.

The system according to Fig. 4 has individual polarizing light splitters, one before each tube, as compared with the single principal polarizer P1 of Fig. 3, but it dispenses with the auxiliary polarizer P2 of Fig. 3. It requires two one-to-one imaging systems $24c$, $24m$ between the tubes. The operation of systems according to Fig. 4 will now be easily comprehensible, especially with the aid of the identification marks which correspond to those of Fig. 3. However, this operation will be shortly recapitulated as follows:

The white light beam B coming from lamp L is at $Py$ divided into two polarized beams $Bs$ and $Bt$, one of which is lost at A. The other is modulated at Y where the blue color aspect record is subtracted. The horizontally polarized beam $Bp$ passes now through imaging lens system $24c$ towards polarizer $Pc$ where the red color aspect record is subtracted. The beam, now vertically polarized, is reflected at $Pc$ and passes further through unit magnification lens system $24m$ towards $Pm$ where it is again reflected towards tube M. There the green color aspect record is subtracted and the beam, now horizontally polarized, passes through $Pm$ and projects through lens system 26 on the screen S.

While the above described systems are only 50% efficient, with one component beam absorbed at A, they can be made fully 100% efficient, as will now be described with reference to Figs. 6 to 8, which apply the invention to subtractive color television systems; an additional 100% efficient system will be described with reference to Fig. 5 which, however, represents an additive color reproduction device.

Referring back to Figs. 1 and 2, if these two figures are combined that is if the sandwich QOR of Fig. 2 is put in the place of absorber A in Fig. 1, or vice versa, the beam $Bt$ (Fig. 1) is then modulated by the second sandwich, and reflected by selective polarizer P towards screen S, the entire energy from source L being utilized. If the modulation of the two sandwiches is identical, the intensity of the screen picture is doubled. If the modulation of the sandwiches is different, various effects can be obtained. For example the two modulations can represent the two color aspects of a two color picture or the right and left eye aspects of a stereoscopic picture polarized in complementary planes, or components such as foreground and background of a single scene.

Fig. 5 illustrates a 100% efficient two color additive system. It will now be evident without further explanation that both beams $Bt$ and $Br$ are utilized. Beam $Bt$ is modulated by tube and sandwich BG corresponding to the blue-green aspect and beam $Br$ is modulated by tube and sandwich YR corresponding to the yellow-red aspect.

The sandwiches can in this instance be complemented by conventional filters $Fbg$ and $Fyr$. Correct color projection can then be obtained by proper choice of scotophors and color filters. The combined two color picture is projected on screen S by the beam $Bt$ after reflection at P and by the beam $Br$ after transmission by P. If the two modulations are identical as for simple black and white projection, the screen brightness is merely doubled. Needless to say the images on both tube faces must be accurately registered with respect to the beam linking surface P.

Fig. 6 illustrates how the efficiency of a subtractive three color system is doubled by doubling the number of tubes which utilize the single light source L. These tube pairs are indicated at Y1, Y2; M1, M2; and C1, C2. They are arranged at opposite sides of three polarizing and light dividing prisms such that the third side of the first prism faces a light source L, the inner side of the first prism and the inner sides of the second and third prisms face each other, and the outer side of the third prism faces a screen S. A projection lens system 21, 22 is interposed between the lamp L and the first prism, a lens system 26 projects the final beam onto the screen S, field lenses 23 are interposed between the prisms and the respective tubes, and lens systems $24c$ and $24m$ define the beams between the inner prism sides. Each tube has a mirror such as indicated at $Ry1$ for tube Y1, a quarter wave plate such as indicated at $Qy1$ for the same tube, and a modulating element such as $Oy1$ of tube Y1. The polarizing means are in this case cubes of the type disclosed in Patent No. 2,449,287 to Flood. Each of these selective polarizers has two crossed optical interference coatings, which are in Fig. 6 indicated at $Py1$, $Py2$; $Pm1$, $Pm2$; $Pc1$, $Pc2$. It will be noted that coating $Py1$ corresponds to Flood's coating 11—12—11 namely the coating which comprises retardation plates, and that coating $Py2$ corresponds to Flood's coating 12 without retardation plates. The two other prism blocks are analogously placed, as indicated in Fig. 6. The paths of the various component light beams are indicated in Fig. 6 as follows.

The unpolarized light beam B after passing through condenser 21 and field lens 22 is transmitted at $Py1$ and $Py2$ as parallel polarized component beam which is deflected therebehind at $Py2$, $Py1$, respectively, without change of polarization. It passes through quarter-wave plates $Qy1$ and $Qy2$, scotophor surfaces $Oy1$ and $Oy2$, is reflected at $Ry1$ and $Ry2$, passes again $Oy1$ and $Oy2$ and quarterwave plates $Qy1$ and $Qy2$ and, now vertically polarized, is reflected by interference coatings $Py1$ and $Py2$. In order to keep Fig. 6 as simple as possible, the beam B is shown as consisting of two identical beams BI, BII, and only the beam BI, that is the one first transmitted by $Py2$, is traced through the entire system and it will be observed that its initially transmitted portion BII emerges after triple modulation at Y2, C2 and M2 in vertically polarized orientation. The initially reflected portion is similarly indicated at BI2, and traced through the entire system. It undergoes triple modulation at Y1, C1 and M1 and emerges in horizontally polarized orientation. The ray BII, that is the one which first encounters $Py1$, is traced only beyond the first cube and again indicated at the screen, but it will now be evident that its transmitted and reflected components are likewise triple modulated, similar to those which are traced to the screen S. The reflected portion of BII is labeled BII1, and its transmitted portion BII2.

It will be noted that tubes Y1 and Y2 subtract the entire blue range from the white light beam coming from lamp L, and that the subtraction of the red and green ranges takes similar place at tube pairs C1, C2 and M1, M2. Intermediate projection lens systems 24c and 24m and a projecting system 26 similar to those described above with reference to Fig. 4, are provided.

Although the system according to Fig. 6 uses more tubes in order to obtain the same amount of light as conventional systems of this type with offset electron beams, it is considerably more compact, doubles the contrast of all of the scotophor images and completely eliminates both electronic and optical off axis skewing. It is also possible to provide 100% efficient systems of the general type according to Fig. 6, with the simple type of polarizer cube such as used in Figs. 1 to 5. Two such embodiments will now be described with reference to Figs. 7 and 8.

The identification marks of Figs. 7 and 8 correspond exactly to those of the preceding figures so that the construction and operation of these embodiments can be understood without further detailed explanation.

The embodiment according to Fig. 7 employs two simple selective polarizers directly associated with pairs of dissimilar modulators, namely $Pcy$ and $Pmy$, whereas the third polarizer $Pcm$ has a function similar to that of P2 of Fig. 3, namely to provide initially two polarized beams. The embodiment according to Fig. 8 associates pairs of similar modulators Y1, Y2; M1, M2; C1, C2 with each of its three cubes $Py$, $Pm$, $Pc$. The apparatus illustrated in Fig. 8 includes two optically aligned polarization selective means, $Py$ and $Pc$ or $Pc$ and $Pm$, or $Pm$, $Pc$ each for reflecting a component beam of light which is polarized at one orientation and for transmitting a component beam of light which is polarized at the complementary polarization, these selective means being placed in series in the original beam; and four sets Y1, Y2, C1 and C2 or C1, C2, M1 and M2 of beam control means, two for each polarization means in its component beams, and each set including optically modulating surface means for impressing an image pattern on the beam by selective transmission, mirror means arranged behind the modulating means for reflecting back through the modulating means the light of the component beam which is directed toward the mirror means after originally impinging on the modulating means, and optical retardation means in front of the modulating means for rotating the plane of polarization of the originally impinging component beam into the complementary orientation upon passing the retardation means a second time. The original beam is thus doubly modulated twice in series, once at each polarization selective means. This feature of stages of double modulation in series is also present in the arrangement of Fig. 6.

As indicated above, it is always desirable to use a simple field lens 23 in front of the tube faces in order to collect the light from the preceding condenser 21 or copy lens 24 and to concentrate it on the next copy lens 24 or objective lens 26.

It will be evident that the embodiments according to Figs. 6, 7 and 8 are suitable for purposes of stereoscopic projection of colored pictures, since each of the finally emerging, complementary polarized beams is fully color modulated. Referring for example to Fig. 6, tubes Y1, M1, C1 are modulated for one, and tubes Y2, M2, C2 for the other eye. The same holds true for the combination of different parts of an object field.

It should be understood that the present disclosure is for the purpose of illustration only and that this invention includes all modifications and equivalents which fall within the scope of the appended claims.

I claim:

1. Optical projection apparatus comprising means for projecting an original beam of light and surface means for converting a pattern which is electrically impressed thereon into a corresponding optically modulating pattern capable of impressing an image pattern on said beam by selective transmission; in combination with polarization selective means for reflecting a component beam of light which is polarized at one orientation and for transmitting a component beam of light which is polarized at the complementary orientation, said polarization selective means being placed in said original beam to direct a selected one of said component beams towards said surface means; mirror means arranged behind said surface means for reflecting the light of said selected component beam which is directed toward the mirror means after originally impinging on said surface means, back through the surface means; and optical retardation means in front of said surface means for rotating the plane of polarization of said selected and originally impinging component beam into said complementary orientation upon passing the retardation means a second time; whereby the selected component beam is doubly modulated and reflected in its own path towards said polarization selective means which permits its progress towards image receiving such as screen means.

2. Apparatus according to claim 1 wherein said modulating means, mirror means and retardation means are placed in the reflected component beam which, upon reflection from said mirror means is transmitted by said polarization selective means towards said screen means.

3. Apparatus according to claim 1 wherein said modulating means, mirror means and retardation means are placed in the transmitted component beam which, upon reflection from said mirror means is reflected by said polarization selective means towards said screen means.

4. Apparatus according to claim 1 in further combination with at least one additional mirror means in the path of said selected component beam, said additional mirror means being placed on the other side of said polarization selective means with respect to the first mirror means—with additional converting surface means in front of said additional mirror means—and with additional retardation means in front of said additional converting surface means.

5. Apparatus according to claim 1, further comprising at least one additional polarization selective means which is arranged in said doubly modulated beam and which is combined with an additional set of modulating means, mirror means and retardation means for further double modulation of said beam.

6. Apparatus according to claim 1, in further combination with an additional set of modulating means, mirror means and retardation means placed in the other one of said component beams, whereby said original beam is modulated four times and emerges essentially unattenuated excepting said modulation.

7. Apparatus according to claim 6 wherein said two modulating means are responsive to distinct modulation as to different aspects of an object field.

8. Apparatus according to claim 6 wherein said two modulating means are responsive to distinct modulation as to different color aspects of an object field.

9. Apparatus according to claim 6 in further combination with at least one additional polarization selective means having two sets of modulating means, mirror means and retardation means, whereby said original beam can be twice doubly modulated at each polarization selective means.

10. Apparatus according to claim 9 wherein two modulating means which are correlated with each polarization selective means are responsive to essentially identical modulation as to a color aspect of an object field.

11. Optical projection apparatus comprising means for projecting a plane polarized beam of light; polarization selective means capable of selectively reflecting light which is polarized at one orientation and for transmitting light which is polarized at the complementary orientation, said selective means being placed in said beam; and two sets of beam control means one on each side of said polarization selective means respectively and each set including surface means for converting a pattern which is electrically impressed thereon into a corresponding optically modulating pattern capable of impressing an image pattern on said beam by selective transmission, mirror means arranged behind said converting surface means for reflecting the light which is directed toward the mirror means after originally impinging on the surface means, back through the surface means, and optical retardation means in front of the surface means for rotating the plane of polarization of the originally impinging beam into said complementary orientation upon passing the retardation means a second time; whereby the polarized beam is twice doubly modulated with double reflection and intermediate transmission by said polarization selective means.

12. Optical projection apparatus comprising means for projecting an original beam of light; two optically aligned polarization selective means for reflecting light which is polarized at one orientation and for transmitting light which is polarized at the complementary orientation, said selective means being placed in series in said beam; and two sets of beam control means, one for each of said polarization selective means and each set including surface means for converting a pattern which is electrically impressed thereon into a corresponding optically modulating pattern capable of impressing an image pattern on said beam by selective transmission, mirror means arranged behind said surface means for reflecting the beam which is directed toward the mirror means after originally impinging on the surface means, back through the surface means, and optical retardation means in front of the surface means for rotating the plane of polarization of the originally impinging component beam into said complementary orientation upon passing the retardation means a second time; whereby a polarized beam is modulated at each set of beam control means and the beam is at one polarization selective means reflected towards its set and after modulation transmitted to the other selective means which transmits it towards its set.

13. Optical projection apparatus comprising means for projecting an original unpolarized beam of light; polarization selective means for reflecting a component beam of light which is polarized at one orientation and for transmitting a component beam of light which is polarized at the complementary orientation, said selective means being placed in said original beam to direct one of said component beams towards one side and the other component beam towards the other side, respectively, of the selective means; and two sets of beam control means one on each side of said polarization selective means and each set including surface means for converting a pattern, which is electrically impressed thereon into a corresponding optically modulating pattern capable of impressing an image pattern on its component beam by selective transmission, mirror means arranged behind the surface means for reflecting the light of the component beam which is directed toward the mirror means after originally impinging on the surface means, back through the surface means, and optical retardation means in front of the surface means for rotating the plane of polarization of said originally impinging component beam into said complementary orientation upon passing the retardation means a second time; whereby said non-polarized original beam is divided into two complemental polarized beams each of which is separately modulated at a respective set of beam control means.

14. Optical projection apparatus comprising means for projecting an original unpolarized beam of light; two optically aligned polarization selective means for reflecting a component beam of light which is polarized at one orientation and for transmitting a component beam of light which is polarized at the complementary orientation, said selective means being placed in series in said original beam; and four sets of beam control means, two for each of said polarization selective means in its component beams and each set including surface means for converting a pattern which is electrically impressed thereon into a corresponding optically modulating pattern capable of impressing an image pattern on said beam; mirror means arranged behind the surface means for reflecting the light of the component beam which is directed toward the mirror means after originally impinging on the surface means, back through the surface means, and optical retardation means in front of said surface means for rotating the plane of polarization of said originally impinging component beam into said complementary orientation upon passing the retardation means a second time; whereby the original beam is twice doubly modulated at each polarization selective means and serially modulated at beam control means of different selective means.

15. Optical projection apparatus comprising means for projecting a beam of light and cathode ray tube screen means for converting a pattern which is electrically impressed thereon by a moving electron beam, into a corresponding optically modulating pattern capable of impressing an image pattern on said beam by selective transmission; in combination with polarization selective means for reflecting a component beam of light which is polarized at one orientation and for transmitting a component beam of light which is polarized at the complementary orientation, said polarization selective means being placed in said original beam to direct one of said component beams towards said screen means; mirror means deposited behind said screen means for reflecting the light of said component beam which is directed toward the mirror means after originally impinging on said screen means, back through the screen means; and a quarter wave plate oriented with its axis at 45° to the polarization plane of said component beam in front of said screen means for rotating the plane of polarization of said originally impinging component beam into said complementary orientation upon passing the retardation means a second time; whereby the component beam is doubly modulated and reflected in its own path towards said polarization selective means which permits its progress towards image receiving such as screen means.

16. Optical arrangement for dividing a light beam into spatially separated partition beams, and for reuniting said partition beams comprising a light divider body having an entrance face and two exit faces, one interference polarizer oriented substantally at 45° to the entrance face of the light divider and dividing the light beams impinging thereon in a reflected portion of one polarization condition and a transmitted portion of a complementary orientation, two mirror surfaces one being arranged at each exit face for reflecting one of said component beams of light polarized at one orientation and two phase retarding foils of preferably λ/4 wave length phase difference, said mirror surfaces being arranged at 45° to said interference polarizer and at 90° to one another to reflect the partition beams back to said interference polarizer, said phase retarding foils being arranged between said interference polarizer and said mirror surfaces, so that they are doubly traversed by the partition beams.

References Cited in the file of this patent

UNITED STATES PATENTS

| | | |
|---|---|---|
| 2,014,688 | Mabboux | Sept. 17, 1935 |
| 2,118,160 | Cawley | May 24, 1938 |
| 2,178,145 | Manly | Oct. 31, 1939 |
| 2,318,705 | Morgan | May 11, 1943 |
| 2,391,450 | Fischer | Dec. 25, 1945 |
| 2,403,731 | MacNeille | July 9, 1946 |
| 2,449,287 | Flood | Sept. 14, 1948 |
| 2,481,622 | Rosenthal | Sept. 13, 1949 |
| 2,601,175 | Smith | June 17, 1952 |
| 2,669,901 | Rehorn | Feb. 23, 1954 |
| 2,669,902 | Barnes | Feb. 23, 1954 |
| 2,672,502 | Albright | Mar. 16, 1954 |
| 2,740,830 | Gretener | Apr. 3, 1956 |

FOREIGN PATENTS

| | | |
|---|---|---|
| 514,776 | Great Britain | Nov. 17, 1939 |